US010257189B2

(12) United States Patent
Chen

(10) Patent No.: US 10,257,189 B2
(45) Date of Patent: Apr. 9, 2019

(54) USING HARDWARE BASED SECURE ISOLATED REGION TO PREVENT PIRACY AND CHEATING ON ELECTRONIC DEVICES

(71) Applicant: Microsoft Technology Licensing, LLC, Redmond, WA (US)

(72) Inventor: Ling Tony Chen, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 230 days.

(21) Appl. No.: 15/163,443

(22) Filed: May 24, 2016

(65) Prior Publication Data

US 2017/0346814 A1 Nov. 30, 2017

(51) Int. Cl.
*H04L 29/06* (2006.01)
*G06F 21/74* (2013.01)
(Continued)

(52) U.S. Cl.
CPC ...... *H04L 63/0853* (2013.01); *G06F 12/1408* (2013.01); *G06F 21/74* (2013.01);
(Continued)

(58) Field of Classification Search
CPC .............. H04L 63/0853; H04L 63/061; H04L 63/0428; H04L 9/0618; G06F 2212/1052
(Continued)

(56) References Cited

U.S. PATENT DOCUMENTS 5,182,770 A 1/1993 Medveczky et al.
6,314,409 B2 11/2001 Schneck et al.
(Continued)

FOREIGN PATENT DOCUMENTS

KR 20020070689 9/2002
WO 2015094261 A1 6/2015

OTHER PUBLICATIONS

Baumann, et al., "Shielding Applications from an Untrusted Cloud with Haven", In ACM Transactions on Computer Systems (TOCS), vol. 33, Issue 3, Aug. 2015, 26 Pages.
(Continued)

*Primary Examiner* — Evans Desrosiers
(74) *Attorney, Agent, or Firm* — Arent Fox LLP

(57) ABSTRACT

System and methods for using secure isolated technology to prevent piracy and cheating on electronic devices. In some examples, an electronic device can use hardware based secure isolated technology to store a first portion of an application in computer memory, and store a second portion of the application in a hardware based secure isolated region of the computer memory, the second portion of the application including an encrypted portion and a plaintext portion The electronic device can further use the hardware based secure isolated technology to establish a secure encrypted communication channel with a server, send data to the server via the secure encrypted communication channel, receive a decryption key from the server via the secure encrypted communication channel, and decrypt encrypted portion using the decryption key. The electronic device can then execute the application using the first portion of the application and the second portion of the application.

15 Claims, 11 Drawing Sheets

(51) Int. Cl.
  *G06F 12/14* (2006.01)
  *H04L 9/06* (2006.01)
(52) U.S. Cl.
  CPC ........ *H04L 9/0618* (2013.01); *H04L 63/0428* (2013.01); *H04L 63/061* (2013.01); *G06F 2212/1052* (2013.01)
(58) Field of Classification Search
  USPC ........................................................ 713/171
  See application file for complete search history.

(56) References Cited

U.S. PATENT DOCUMENTS

| | | | |
|---|---|---|---|
| 7,200,760 B2 | 4/2007 | Riebe et al. | |
| 8,266,710 B2 | 9/2012 | Ai-Azzawi | |
| 8,433,927 B2 | 4/2013 | Plouffe, Jr. et al. | |
| 8,578,510 B2 | 11/2013 | Cook et al. | |
| 2002/0087883 A1 | 7/2002 | Wohlgemuth et al. | |
| 2003/0233547 A1 | 12/2003 | Gaston et al. | |
| 2004/0025033 A1 | 2/2004 | Todd | |
| 2006/0059571 A1 | 3/2006 | Chen et al. | |
| 2010/0119068 A1 | 5/2010 | Harris | |
| 2012/0159184 A1* | 6/2012 | Johnson | G06F 21/6218 713/189 |
| 2015/0026483 A1 | 1/2015 | Jiang et al. | |
| 2015/0089247 A1* | 3/2015 | Kang | G06F 21/305 713/193 |

OTHER PUBLICATIONS

Costan, et al., "Intel SGX Explained", In International Association for Cryptologic Research Cryptology ePrint Archive, vol. 86, Jan. 31, 2016, 118 Pages.

McCune, et al., "TrustVisor: Efficient TCB Reduction and Attestation", In IEEE Symposium on Security and Privacy, May 16, 2010, pp. 143-158.

"International Search Report and Written Opinion Issued in PCT Application No. PCT/US2017/033198", dated Jul. 26, 2017, 10 Pages.

Jeong, et al., "An Anti-Piracy Mechanism based on Class Separation and Dynamic Loading for Android Applications", In Proceedings of the ACM Research in Applied Computation Symposium, Oct. 23, 2012, pp. 328-332.

* cited by examiner

USING HARDWARE BASED SECURE ISOLATED REGION TO PREVENT PIRACY AND CHEATING ON ELECTRONIC DEVICES

BACKGROUND

When designing electronic devices, developers try to create anti-piracy measures (e.g., software techniques) for the electronic devices that protect applications from malicious users. However, even the current anti-piracy measures that are place, malicious users often are still able to manipulate the electronic devices in order to pirate applications. Conventionally, a malicious user of an electronic device will modify the operating system, the hypervisor, and/or the firmware of the electronic device. Using the modified electronic device, the malicious user is then able extract code for an application that the user needs to maliciously execute the application on the electronic device.

SUMMARY

This disclosure describes techniques for using secure isolated technology to prevent piracy and cheating on electronic devices. In some examples, an electronic device includes secure isolated technology that enables a processor of the electronic device to operate in a secure mode and store data and/or code in a hardware based secure isolated region of computer memory. For instance, the electronic device can store a first portion of an application in the computer memory and store a second portion of the application in the hardware based secure isolated region of the computer memory. The second portion of the application can include a plaintext portion and an encrypted portion. In some examples, the encrypted portion includes code for the application that is critical to the usage of the application. Without the encrypted portion being accurately decrypted and executed, the application is restricted from functioning correctly and thus, restricted from pirating.

To execute the application, the electronic device can utilize the plaintext portion of the application to establish a secure encrypted communication channel with a server via a network. The electronic device can further utilize the plaintext portion of the application to send data to the server and receive a decryption key from the server via the secure encrypted communication channel. In some examples, the data includes attestation information, such as an identifier for a central processing unit (CPU) chip on the electronic device, proof that the code on the electronic device is indeed running on a device that supports hardware based secure isolation technology, and/or a digest of the secure isolated region. The electronic device can then use the decryption key to decrypt the encrypted portion of the application within the hardware based secure isolated region. After decrypting, the electronic device can execute the application using the first portion of the application and the second portion of the application.

By using secure isolated technology that enables the processor to run in a secure mode and execute code in the hardware based secure isolated region of the computer memory, an operating system, a hypervisor, and/or firmware of the electronic device are restricted from accessing data within the hardware based secure isolated region of the computer memory. As such, even if a user manipulates the electronic device, portions of the application (e.g., critical code of the application) within the hardware based secure isolated region are still secure from extraction. Additionally, using a manipulated electronic device, a user is restricted from modify portions of the application that are within the hardware based secure isolated region. Therefore, a user of the electronic device is restricted form pirating the application and/or cheating while the electronic device is executing the application.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
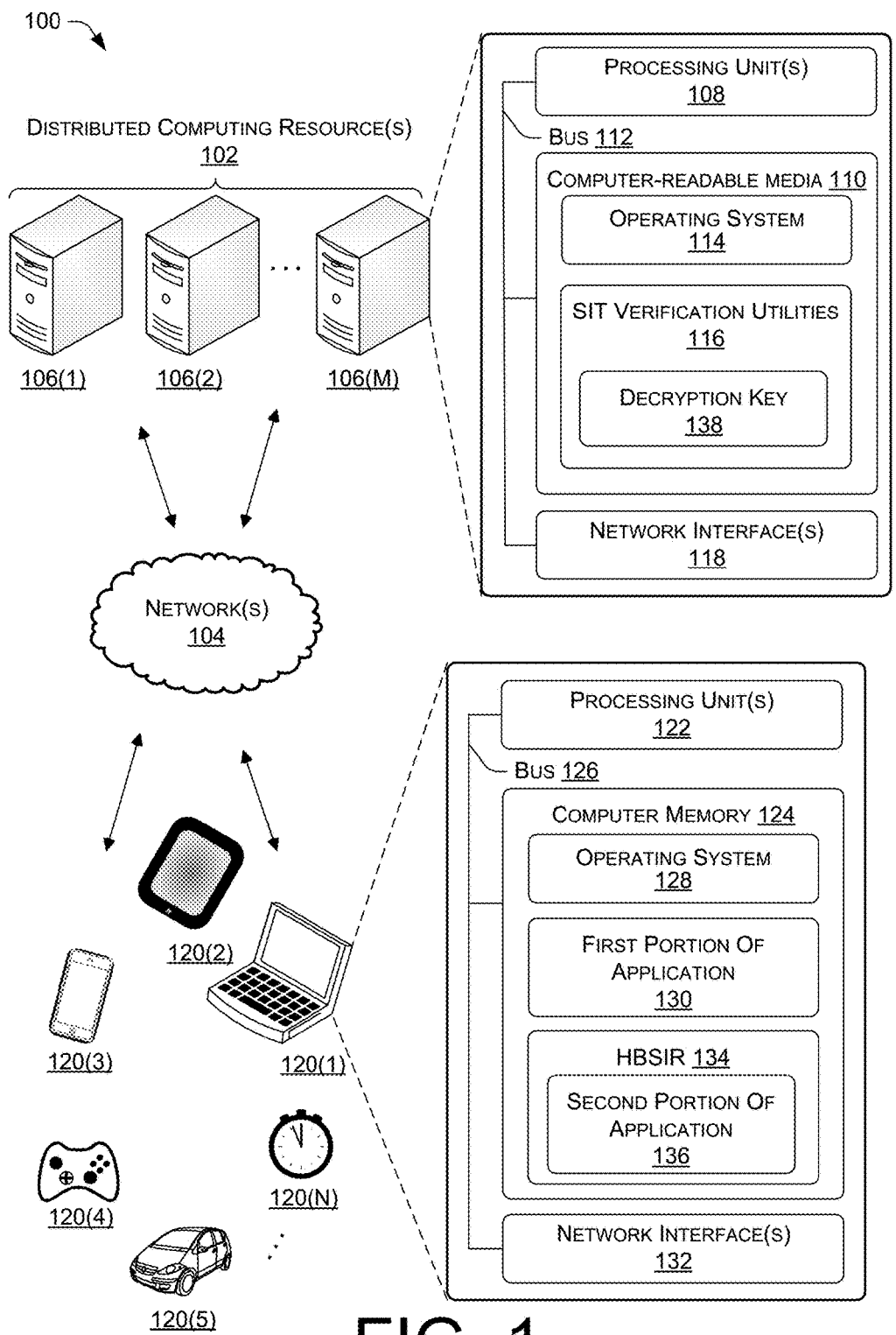
FIG. 1 is a block diagram illustrating an example environment in which techniques for using hardware based secure isolated technology to prevent piracy and cheating on electronic devices can operate.

Examples described herein provide techniques for using secure isolated technology to prevent piracy and cheating on electronic devices. In some examples, an electronic device includes hardware based secure isolated technology that protects data and/or code on the electronic device. The secure isolated technology protects the data and/or code by enabling a processor of the electronic device to operate in a secure mode, and by storing the data and/or code in a hardware based secure isolated region of computer memory. In some examples, an operating system, a hypervisor, and/or firmware of the electronic device are restricted from accessing the data and/or code within the secure isolated region of the computer memory. As such, even if a user manipulates the electronic device (e.g., the operating system, hypervisor, and/or firmware of the electronic device), the data and/or code within the hardware based secure isolated region is still secure from extraction and manipulation. An example of hardware based secure isolation technology is Intel's Software Guard Extensions (SGX), but such technologies could also come from other hardware manufacturers. The functionality of the secure isolation technology includes the following:

- The ability to keep code and data in the hardware based secure isolated region secret from the rest of the computer system include the OS supervisor and hypervisor.
- The ability to attest to a server from within the hardware based secure isolated region that the region is indeed running on a machine with hardware based secure isolation region.
- The ability to attest to a server from within the hardware based secure isolated region the cryptographic digest/measurement of the hardware based secure isolation region currently executing.
- The ability to attest to a server from within the hardware based secure isolated region a unique ID that uniquely identifies this electronic device from other electronic devices with hardware based secure isolation technology.
- The ability to generate within the hardware based secure isolated region a key that can be used as a sealing key that can only be regenerated if the exact same hardware based secure isolated region is executing on the exact same hardware again.

In some examples, the electronic device stores a first portion of an application (e.g., first portion of code) in the computer memory and a second portion of the application (e.g., second portion of code) in the hardware based secure isolated region of the computer memory. The second portion of the application can include a plaintext portion and an encrypted portion. In some examples, the plaintext portion can include code that the electronic device uses to retrieve a decryption key from a server. For instance, the plaintext portion can include licensing code for the application. In some examples, the encrypted portion can include code that is critical for the application to execute properly. For instance, the encrypted portion of a game can include code for AI heuristics, 3D physics calculations, custom graphics processing unit command generation, or the like for the application.

In some examples, to execute the application, the electronic device uses the plaintext portion to establish a secure encrypted communication channel with a server (e.g., a licensing server). The electronic device can further use the plaintext portion to send data to the server via the secure encrypted communication channel. For instance, the electronic device can attest to the server by sending particular data (e.g., attestation information) to the server. In some examples, the data can include an identifier of a central processing unit (CPU) chip of the electronic device (e.g., a CPU chip number), proof that the code on the electronic device is indeed running on a device that supports hardware based secure isolation technology, and/or a digest of the code and data in the hardware based secure isolated region. In such examples, the digest of the secure isolated region can include both the plaintext portion and the encrypted portion. Using the data, the server can verify the hardware based secure isolated region is running on an electronic device that supports the hardware based secure isolation technology. Additionally, in some examples, the server can further verify by looking up a payment record database whether the electronic device and/or a user of the electronic device has a license for the application. If the application is appropriately licensed, the server can then send a decryption key to the electronic device via the secure encrypted communication channel.

In some examples, the electronic device uses the decryption key to decrypt the encrypted portion within the hardware based secure isolated region. After decryption, the electronic device can use the first portion, the plaintext portion, and the decrypted portion to execute the application. For instance, the electronic device can use the CPU to execute the first portion of the application stored in the computer memory. The electronic device can further use the CPU to execute the plaintext portion and the decrypted portion stored within the hardware based secure isolated region of the computer memory.

In some examples, when the electronic device finishes executing the application, the hardware based secure isolated region can generate a sealing key, which the plaintext portion can use to encrypt the decryption key. The electronic device can store the encrypted decryption key in the non-volatile computer-readable storage media. This enables the decryption key to be recovered after a reboot and thus enables the application to be used offline (without access to a licensing server) after the decryption key is initially acquired. In some examples, the exact same sealing key can only be recovered by the exact same hardware based secure isolated region running on the exact same electronic device again, and thus prevents piracy on other electronic devices.

Additionally or alternatively, a developer can cause the electronic device to store code in the hardware based secure isolated region that prevents a user from cheating. For instance, in some examples, the encrypted portion of the application can include code that confirms that other portions of the application (e.g., the first portion of the application) are running properly and hasn't been maliciously modified. For instance, the encrypted portion can include code that periodically checks and confirms that the first portion of the application has not been tampered with. Additionally or alternatively, in some examples, the encrypted portion can include data that users would manipulate in order to cheat. For instance, if the application includes a videogame where each player includes a health status, the encrypted portion can include the variable data that keeps track of a player's health status. Because this health status data is now stored in the hardware based secure isolated region, it is restricted from being modified by a user intending to cheat in the game.

Various examples, scenarios, and aspects are described further with reference to FIGS. 1-10.

Illustrative Environment

FIG. 1 shows an example environment 100 in which techniques for using hardware based secure isolated technology to prevent piracy and cheating on electronic devices can operate. In some examples, the various devices and/or components of environment 100 include distributed computing resources 102 that can communicate with one another and with external devices via one or more networks 104.

Network(s) 104 can include, for example, public networks such as the Internet, private networks such as an institutional and/or personal intranet, or some combination of private and public networks. Network(s) 104 can also include any type of wired and/or wireless network, including but not limited to local area networks (LANs), wide area networks (WANs), satellite networks, cable networks, Wi-Fi networks, WiMax networks, mobile communications networks (e.g., 3G, 4G, and so forth) or any combination thereof. Network(s) 104 can utilize communications protocols, including packet-based and/or datagram-based protocols such as internet protocol (IP), transmission control protocol (TCP), user datagram protocol (UDP), or other types of protocols. Moreover, network(s) 104 can also include a number of devices that facilitate network communications and/or form a hardware basis for the networks, such as switches, routers, gateways, access points, firewalls, base stations, repeaters, backbone devices, and the like.

In some examples, network(s) 104 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and other standards.

In various examples, distributed computing resources 102 include devices 106(1)-106(M). Examples support scenarios where device(s) 106 can include one or more computing devices that operate in a cluster or other grouped configuration to share resources, balance load, increase performance, provide fail-over support or redundancy, or for other purposes. Device(s) 106 can belong to a variety of categories or classes of devices such as traditional server-type devices, desktop computer-type devices, mobile-type devices, special purpose-type devices, embedded-type devices, and/or wearable-type devices. Thus, although illustrated as a single type of device, device(s) 106 can include a diverse variety of device types and are not limited to a particular type of device. Device(s) 106 can represent, but are not limited to, desktop computers, server computers, web-server computers, personal computers, mobile computers, laptop computers, tablet computers, wearable computers, implanted computing devices, telecommunication devices, automotive computers, network enabled televisions, thin clients, terminals, personal data assistants (PDAs), game consoles, gaming devices, Internet of Things (IoT) devices, work stations, media players, personal video recorders (PVRs), set-top boxes, cameras, integrated components (i.e., peripheral devices) for inclusion in a computing device, appliances, or any other sort of computing device.

Device(s) 106 can include any computing device having one or more processing unit(s) 108 operably connected to computer-readable media 110 such as via a bus 112, which in some instances can include one or more of a system bus, a data bus, an address bus, a PCI bus, a Mini-PCI bus, and any variety of local, peripheral, and/or independent buses. Executable instructions stored on computer-readable media 110 can include, for example, an operating system 114, a secure isolation technology (SIT) verification utilities 116, and other modules, programs, or applications that are loadable and executable by processing units(s) 108. Alternatively, or in addition, the functionally described herein can be performed, at least in part, by one or more hardware logic components such as accelerators. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. For example, an accelerator can represent a hybrid device, such as one from ZYLEX or ALTERA that includes a CPU embedded in an FPGA fabric.

Device(s) 106 can also include one or more network interfaces 118 to enable communications between computing device(s) 106 and other networked devices such as client computing device(s) 120. Such network interface(s) 118 can include one or more network interface controllers (NICs) or other types of transceiver devices to send and receive communications over a network. For simplicity, other components are omitted from the illustrated device(s) 106.

Other devices configured to implement techniques for using secure isolated technology to prevent piracy and cheating on electronic devices can include client computing devices, for example one or more of client computing devices 120(1)-120(N). Client computing device(s) 120 can belong to a variety of categories or classes of devices, which can be the same as, or different from, device(s) 106, such as traditional client-type devices, desktop computer-type devices, mobile-type devices, special purpose-type devices, embedded-type devices, and/or wearable-type devices. Client computing device(s) 120 can include, but are not limited to, a laptop computer 120(1), a tablet computer 120(2) telecommunication devices such as a mobile phone 120(3), computer navigation type client computing devices such as satellite-based navigation systems including global positioning system (GPS) devices and other satellite-based navigation system devices, a mobile phone/tablet hybrid, a personal data assistant (PDA), a personal computer, other mobile computers, wearable computers, implanted computing devices, desktop computers, automotive computers, network-enabled televisions, thin clients, terminals, game consoles, gaming devices 120(4), a network connected vehicle 120(5), Internet of Things (IoT) devices 120(N), work stations, media players, personal video recorders (PVRs), set-top boxes, cameras, integrated components (e.g., peripheral devices) for inclusion in a computing device, appliances, or any other sort of computing device.

Client computing device(s) 120 of the various categories or classes and device types, such as the laptop computer 120(1), can represent any type of computing device having one or more processing unit(s) 122 operably connected to computer memory 124 such as via a bus 126, which in some instances can include one or more of a system bus, a data bus, an address bus, a PCI bus, a Mini-PCI bus, and any variety of local, peripheral, and/or independent buses.

Executable instructions stored on computer memory 124 can include, for example, an operating system 128, a first portion of an application 130 and other modules, programs, or applications that are loadable and executable by processing units(s) 122.

Client computing device(s) 120 can also include one or more network interfaces 132 to enable communications between client computing device(s) 120 and other networked devices, such as other client computing device(s) 120 or device(s) 106 over network(s) 104. Such network interface(s) 132 can include one or more network interface controllers (NICs) or other types of transceiver devices to send and receive communications over a network.

In the examples of FIG. 1, client computing device(s) 120 can include hardware based secure isolated technology that protects data and/or code on the client computing device(s)

120. The hardware based secure isolated technology protects the data and/or code by enabling processing unit(s) 122 of the client computing device(s) 120 to operate in a secure mode, and by storing the data and/or code in a hardware based secure isolated region (HBSIR) 132 of the computer memory 124. In some examples, an operating system 128, a hypervisor, and/or firmware of the client computing device(s) 120 are restricted from accessing the data and/or code within the hardware based secure isolated region 134 of the computer memory 124. As such, even if a user manipulates the client computing device(s) 120 (e.g., the operating system 128, hypervisor, and/or firmware of the computing device(s) 120), the data and/or code within the hardware based secure isolated region 134 is still secure from extraction and manipulation.

For instance, in some examples, processing unit(s) 122 the client computing device(s) 120 can include SKYLAKE CHIPS from INTEL that include SECURE GUARD EXTENSIONS (SGX). In such examples, SGX can enable the processing unit(s) 122 to execute in an "enclave" mode where the data and/or code within the ENCLAVE, which can include the hardware based secure isolated region 134, can be kept secret despite a malicious operating system 128, hypervisor, and/or firmware.

In the example of FIG. 1, the hardware based secure isolated region 134 stores a second portion of an application 136. For instance, in the example of FIG. 1, the first portion of the application 130 and the second portion of the application 136 may include code for a single application. In some examples, the first portion of the application 130 includes plaintext, and the second portion of the application 136 includes a plaintext portion and an encrypted portion. As such, the client computing device(s) 120 can execute the application using the first portion of the application 130 stored in the computer memory 123 and the second portion of the application 136 stored in the hardware based secure isolated region 134.

For instance, in some example, the client computing device(s) 120 can use the second portion of the application (e.g., the plaintext) to establish a secure encrypted communication channel with the device(s) 106. For instance, the processing unit(s) 122 can execute computer-readable instructions included in the plaintext portion that cause the processing unit(s) 122 to establish the secure encrypted communication channel. Using the secure encrypted communication channel, the hardware based secure isolated region 134 can indirectly communication with the device(s) 106 via the client computing device(s) 120.

For instance, the client computing device(s) 120 can attest to the device(s) 106 by sending data to the device(s) 106 via the secure encrypted communication channel. In some examples, the data can include an identification of the processing unit(s) 122 (e.g., a CPU chip number), proof that the code on the computing device(s) 120 is indeed running on a device that supports hardware based secure isolation technology, and/or a digest of the hardware based secure isolated region 134. In such examples, the digest of the hardware based secure isolated region 134 includes the plaintext portion and the encrypted portion. Using the data, the device(s) 106 can verify that the hardware based secure isolated region 134 is running on client computing device(s) 120 that support the hardware based secure isolated technology. Additionally, in some examples, the device(s) 106 can verify that the client computing device(s) 120 and/or a user of the client computing device(s) 120 includes a license for the application. The device(s) 106 can then send a decryption key 138 to the client computing device(s) 120 via the secure encrypted communication channel.

After receiving the decryption key 138, the client computing device(s) 120 can use the decryption key 138 to decrypt the encrypted portion of the application. For instance, the processing unit(s) 122 can execute computer-readable instructions included in the plaintext portion that cause the processing unit(s) 122 to decrypt the encrypted portion using the decryption key 138. The client computing device(s) 120 can then execute the encrypted second portion of the application within the hardware based secure isolated region 134.

Figure 2:
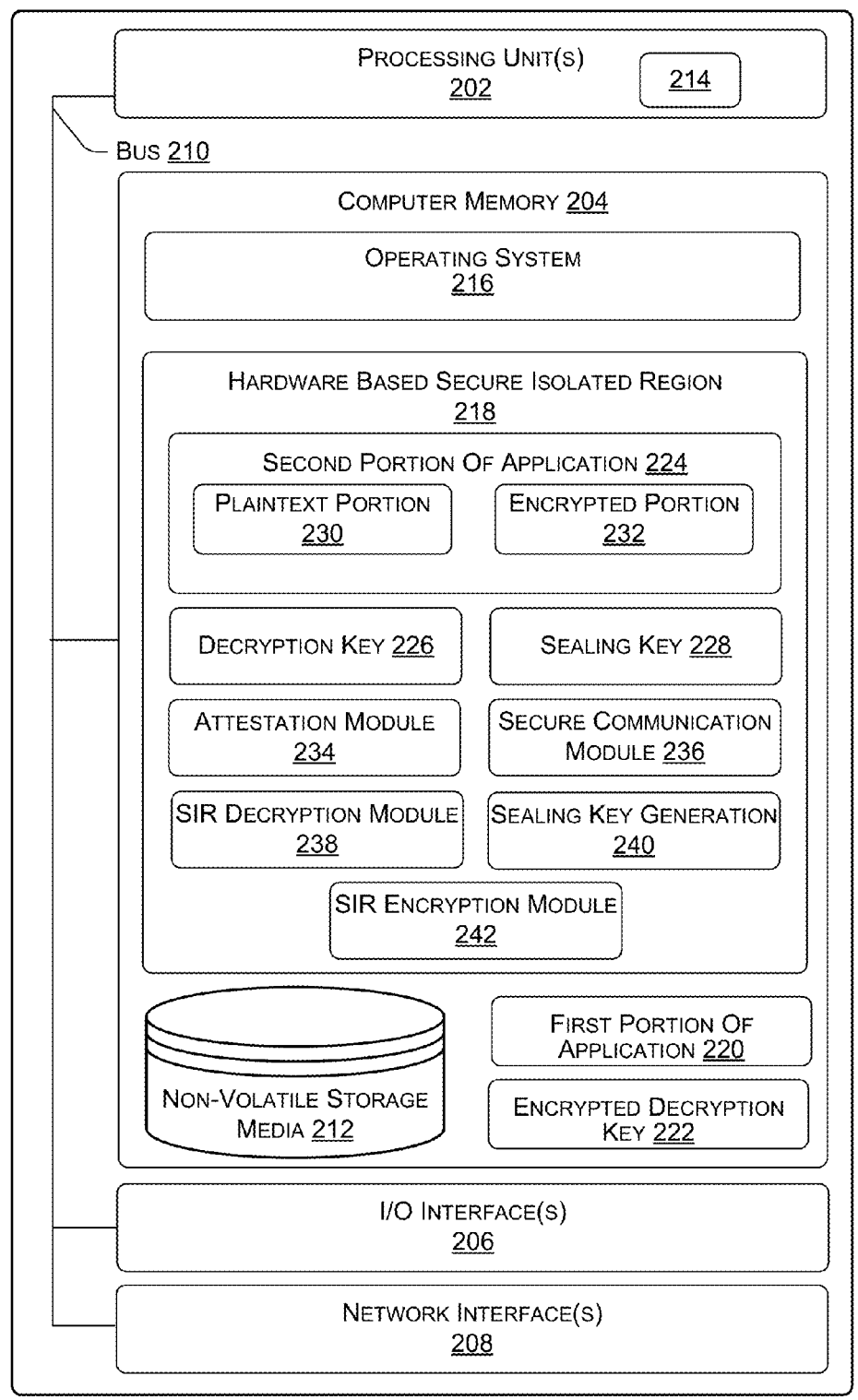
FIG. 2 is a block diagram illustrating an example client computing device configured to utilize hardware based secure isolated technology to prevent piracy and cheating.

FIG. 2 is a block diagram illustrating an example client computing device 200 configured to utilize hardware based secure isolated technology to prevent piracy and cheating. Computing device 200 can represent client computing device(s) 120. Example computing device 200 includes one or more processing unit(s) 202, computer memory 204, input/output interface(s) 206, and network interface(s) 208. The components of computing device 200 are operatively connected, for example, via a bus 210, which can represent bus 126.

In example computing device 200, processing unit(s) 202 may correspond to processing unit(s) 122, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer memory 204 may correspond to computer memory 124, and can store instructions executable by the processing unit(s) 202. Computer memory 204 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 200, while in some examples one or more of a CPU, GPU, and/or accelerator is external to computing device 200.

Computer memory 204 can include computer storage media. Computer storage media can include one or more of volatile memory, nonvolatile memory, and/or other persistent and/or auxiliary computer storage media, removable and non-removable computer memory implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, or any other storage memory, storage device, and/or storage medium that can be used to store and maintain information for access by a computing device.

Input/output (I/O) interfaces 206 allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 208, which may correspond to network interface(s) 132, can represent, for example, network interface controllers (NICs) or other types of transceiver devices to send and receive communications over a network.

In the illustrated example, computer memory 204 includes non-volatile storage media 212. Non-volatile storage media 212 can store data for the operations of processes, applications, components, and/or modules stored in computer memory 204 and/or executed by processing unit(s) 202 and/or accelerator(s). Additionally, in some examples, some or all of the above-referenced data can be stored on separate memories 214 on board one or more processing unit(s) 202 such as a memory on board a CPU-type processor, a GPU-type processor, an FPGA-type accelerator, a DSP-type accelerator, and/or another accelerator.

In the illustrated example of FIG. 2, computer memory 204 also includes operating system 216, which can represent operating system 128. Additionally, computer memory 204 includes hardware based secure isolated region 218 and first portion of application 220, which can represent hardware based secure isolated region 134 and first portion of application 130, respectively. Furthermore, computer memory 204 includes encrypted decryption key 222.

In the example of FIG. 2, the hardware based secure isolated region 218 stores second portion of application 224 (which can represent second portion of application 136), decryption key 226, and sealing key 222. In some examples, the first portion of the application 220 stored in computer memory 204 and the second portion of the application 224 stored in hardware based secure isolated region 218 include the data and code for a software application. For instance, the first portion of the application 220 can include plaintext for the application. The second portion of the application 224 can include a plaintext portion 230 of the application and an encrypted portion 232 of the application. In some examples, the plaintext portion 230 includes standard licensing code that downloads the decryption key 226 for decrypting the encrypted portion 230. In some examples, the encrypted portion 232 includes code that is critical to properly executing the application. For instance, the encrypted portion 232 for a game can include code for AI heuristics, physics calculations, custom graphics processing unit command generation, or the like.

The hardware based secure isolated region 218 can further include one or more modules, which are illustrated as blocks 234, 236, 238, 240, 242, although this is just an example, and the number can vary higher or lower. Functionality described associated with blocks 234, 236, 238, 240, 242 can be combined to be performed by a fewer number of modules or it can be split and performed by a larger number of modules. Additionally, in some examples, some of the functionality associated with blocks 234, 236, 238, 240, 242 may be performed by modules that are not included in hardware based secure isolated region 218.

Block 234 includes logic to program processing unit(s) 202 of computing device 200 to perform the attestation processes described herein for computing device 200. For instance, processing unit(s) 202 can execute attestation module 234 to attest to a server, such as device(s) 106 from FIG. 1. In some examples, to attest to the server, the computing device 200 uses the plaintext portion 230 within the hardware based secure isolated region 218 to establish a secure encrypted communication channel with the server. For example, the Diffie-Hellman key exchange algorithm can be used to setup this secure encrypted communication channel. For instance, the processing unit(s) 202 can execute code included in the plaintext portion 230 that causes the processing unit(s) 202 to establish the secure encrypted communication channel with the server via network interface(s) 208.

In some examples, the computing device 200 establishes the secure encrypted communication channel in response to a user using the computing device 200 to execute the application. After establishing the secure encrypted communication channel, the hardware based secure isolated region 218 can indirectly communicate with the servers via the computing device 200. For instance, through the secure encrypted communication channel, the computing device 200 can use the attestation module 234 to send data to the server for performing attestation. In some examples, the data includes an identifier of a processing unit(s) 202 of the electronic device (e.g., a CPU chip number), proof that the code on the electronic device is indeed running on a device that supports hardware based secure isolation technology, and/or a digest of the hardware b secure isolated region 218. In such examples, the digest of the hardware based secure isolated region 218 includes the plaintext portion 230 and the encrypted portion 232. Using the data, the server can verify that the hardware based secure isolated region 218 is running on a computing device 200 that supports hardware based secure isolated technology. Additionally, in some examples, the server can verify that the computing device 200 and/or a user of the computing device 200 includes a license for the application. The server can then send a decryption key 226 (which can represent decryption key 138) to the computing device 200 via the secure encrypted communication channel.

Block 236 includes logic to program processing unit(s) 202 of computer device 200 to establish a secure channel with a server. For instance, processing unit(s) 202 can execute secure communication module 236, which can utilize the network interface(s) 208, to establish a secure encrypted communication channel with a server, such as device(s) 106 from FIG. 1. In some examples, the secure communication module 236 can utilize a Diffie-Hellman key exchange algorithm to setup the secure encrypted communication channel with the server. In some examples, the processing unit(s) 202 execute the secure communication module 236 to establish the secure encrypted communication channel in response to a user using the computing device 200 to execute the application.

Block 238 includes logic to program processing unit(s) 202 of computing device 200 to decrypt data and/or code that is within the hardware based secure isolated region 218. For instance, the computing device 200 can utilize the secure isolated region (SIR) decryption module 238 to decrypt the encrypted portion 232 of the application within the hardware based secure isolated region 218. Decrypting the encrypted portion 232 can generate a decrypted portion of the application. In some examples, the decrypted portion can include code that the processing unit(s) 202 execute within the hardware based secure isolated region 218 during execution of the application. In some examples, the computing device 200 utilizes the SIR decryption module 238 to decrypt the encrypted portion 232 using the decryption key 226 each time the computing device 200 attempts to execute the application.

The computing device 200 can further utilize the SIR decryption module 238 to decrypt the encrypted decryption key 222 within the hardware based secure isolated region 218. For instance, in some examples, the computing device 200 encrypts the decryption key 226 using the sealing key 228 and stores the encrypted decryption key 222 in the computer memory 204. In such examples, the computing device 200 can utilize the SIR decryption module 238 to decrypt the encrypted decryption key 222 within the hardware based secure isolated region 218 using the sealing key 228 in order to retrieve the decryption key 226.

Block 240 includes logic to program processing unit(s) 202 of computing device 200 to generate the sealing key 228. For instance, the computing device 200 can utilize the sealing key generation module 240 to generate the sealing key 228. In some examples, the sealing key 228 must be specific to the processing unit(s) 202 and/or the hardware based secure isolated region 218. For instance, in such examples, only a computing device 200 that includes the processing unit(s) 202 and the hardware based secure isolated region 218 can generate the sealing key 228. In some examples, the computing device 200 utilizes the sealing key generation module 240 to generate the sealing key 228 each time the computing device 200 needs to encrypt the decryption key 226 and/or each time the computing device 200 needs to decrypt the encrypted decryption key 222.

Block 242 includes logic to program processing unit(s) 202 of computing device 200 to encrypt the decryption key 226 using the sealing key 228. For instance, the computing device 200 can utilize the secure isolated region encryption module 242 to encrypt the decryption key 226 using the sealing key 228 in order to generate the encrypted decryption key 222. In some examples, the computing device 200 can then save the encrypted decryption key 222 in the computer memory 204. For instance, in some examples, the computing device 200 stores the encrypted decryption key 222 in the non-volatile storage media 212.

It should be noted that, in some examples, the computing device 200 may receive a floating license from the server. In such examples, the computing device 200 does not encrypt the decryption key 226 using the sealing key 228 and never stores the decryption key (whether encrypted or not) outside of the hardware based secure isolated region 218. Instead, the system will need to make sure this license to use the application is only used by one electronic device at a time. In order to do this, when the computing device 200 receives a floating license, the computing device 200 and/or the hardware based secure isolated region 218 can receive instructions from the server to communicate with the server periodically (e.g., a time interval, such as every minute, every ten minutes, or the like). The hardware based secure isolated region 218 can then cause the plaintext portion 230 and/or the decrypted portion of the application to terminate execution when (1) the computing device 200 and/or the hardware based secure isolated region 218 is not able to communicate with the server, or (2) a user of the computing device 200 uses a different computing device to license the application with the same license as the user used on the computing device 200.

Figure 3:
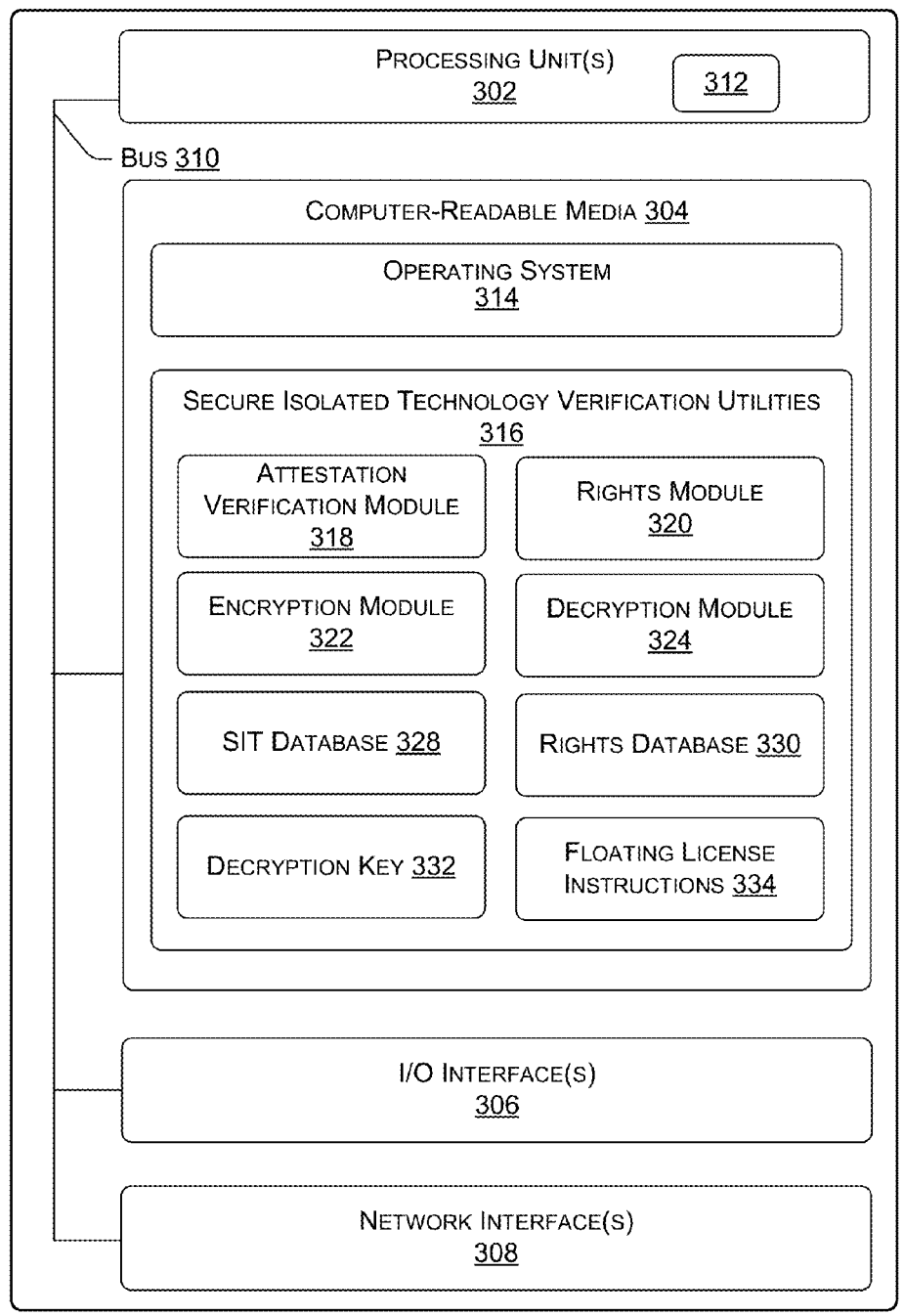
FIG. 3 is a block diagram illustrating an example computing device configured to perform techniques associated with preventing piracy and cheating on an electronic device that utilizes hardware based secure isolated technology.

FIG. 3 is a block diagram illustrating an example server computing device configured to perform techniques associated with preventing piracy and cheating on an electronic device that verifies hardware based secure isolated technology. Computing device 300 can represent device(s) 106. Example computing device 300 includes one or more processing unit(s) 302, computer-readable media 304, input/output interface(s) 306, and network interface(s) 308. The components of computing device 300 are operatively connected, for example, via a bus 310, which can represent bus 112.

In example computing device 300, processing unit(s) 302 may correspond to processing unit(s) 108, and can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc.

Computer-readable media 304 may correspond to computer-readable media 110, and can store instructions executable by the processing unit(s) 302. Computer-readable media 304 can also store instructions executable by external processing units such as by an external CPU, an external GPU, and/or executable by an external accelerator, such as an FPGA type accelerator, a DSP type accelerator, or any other internal or external accelerator. In various examples at least one CPU, GPU, and/or accelerator is incorporated in computing device 300, while in some examples one or more of a CPU, GPU, and/or accelerator is external to computing device 300.

Computer-readable media 304 can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Input/output (I/O) interfaces 306 allow computing device 300 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like).

Network interface(s) 308, which may correspond to network interface(s) 118, can represent, for example, network interface controllers (NICs) or other types of transceiver devices to send and receive communications over a network.

In the illustrated example, processing unit(s) 312 includes separate memories 312. In some examples, some or all of the above-referenced data can be stored on separate memories 312 on board one or more processing unit(s) 302 such as a memory on board a CPU-type processor, a GPU-type processor, an FPGA-type accelerator, a DSP-type accelerator, and/or another accelerator.

In the illustrated example of FIG. 3, computer-readable media 304 includes operating system 314, which can represent operating system 114. Additionally, computer-readable media 304 includes secure isolation technology verification utilities 316. Secure isolated technology verification utilities 316 can include one or more modules, which are illustrated as blocks 318, 320, 322, and 324, although this is just an example, and the number can vary higher or lower. Functionality described associated with blocks 318, 320, 322, and 324 can be combined to be performed by a fewer number of modules or it can be split and performed by a larger number of modules. Additionally, in some examples, some of the functionality associated with blocks 318, 320, 322, and 324 may be performed by modules that are not included in secure isolation technology verification utilities 116.

Block 318 includes logic to program processing unit(s) 302 of computing device 300 to perform the attestation processes described herein for computing device 300. For instance, computing device 300 can receive data (e.g., attestation information) from an electronic device, such as a client computing device 120 from FIG. 1, via a secure encrypted communication channel. The computing device 300 can utilize the attestation verification module 318 to perform attestation verification in order verify that the electronic device is running hardware based secure isolated technology using the data. In some examples, the data can include an identifier of a central processing unit (CPU) chip of the electronic device (e.g., a CPU chip number), proof that the code on the electronic device is indeed running on a device that supports hardware based secure isolation technology, and/or a digest value of the hardware based secure isolated region.

For instance, the computing device 300 can perform attestation by verifying the electronic device includes a CPU chip that is trusted and includes hardware based secure isolated technology. For instance, the server can verify the identity of the CPU chip and the identity of the hardware based secure isolated region using the secure isolation technology (SIT) database 326. The SIT database 326 can include data that associates electronic devices with hardware based secure isolated technology. As such, the computing device 300 can use the SIT database 326 to verify that the CPU chip of the electronic device matches the hardware based secure isolated technology on the electronic device. In some examples, if the computing device 300 determines that the CPU chip matches the hardware based secure isolated technology on the electronic device, then the computing device 300 can verify the hardware based secure isolated technology on the electronic device. However, if the computing device determines that the CPU chip does not match the hardware based secure isolated technology on the electronic device, then the computing device 300 does not verify the hardware based secure isolated technology on the electronic device.

Block 320 includes logic to program processing unit(s) 302 of computing device 300 to determine rights associated with an application with regard to an electronic device. For instance, in some examples, after verifying the electronic device, the computing device 300 can execute the rights module 320 to determine whether the electronic device includes rights to execute the application.

For instance, in some examples, the computing device 300 can utilize the rights database 328 to determine whether the electronic device includes rights to execute the application. The rights database 328 can include data indicating users and/or electronic devices that include rights associated with various applications. As such, the computing device 300 can use the rights database 328 to determine whether the electronic device and/or a user of the electronic device includes rights associated with the application. In some examples, the computing device 300 can use the identity of the CPU chip to determine whether the electronic device has licensing rights associated with the application. In some examples, if the computing device 300 receives credentials (e.g., user account information) for a user along with the data, the computing device 300 can determine whether the user has licensing rights associated with the application.

In some examples, rights associated with an application can include a permanent license or a floating license for the application. Based on a user and/or electronic device including a permanent license for the application, the computing device 300 can send the electronic device the decryption key 330 (which can represent decryption key 138) for the application. Based on the user and/or electronic device including a floating license for the application, the computing device 300 can send the electronic device both the decryption key 330 for the application and floating license instructions 332 associated with the floating license.

In some examples, the floating license instructions 332 can cause the hardware based secure isolated technology on the electronic device to periodically verify the floating license with the computing device 300. For instance, the floating license instructions 332 can cause the hardware based secure isolated technology to communicate with the computing device 300 at given time intervals (e.g., every thirty second, every minute, every hour, or the like) to verify that the floating license for the application on the electronic device is still valid. In some examples, the computing device 300 can determine that the floating license is no longer valid based on the computing device 300 receiving similar credentials (e.g., user account information) from the user on an additional electronic device. In such examples, the computing device 300 can send the electronic device a message indicating that the floating license is no longer valid on the electronic device.

Block 322 includes logic to program processing unit(s) 302 of computing device 300 to encrypt communications between the computing device 300 and electronic devices. Additionally, block 324 includes logic to program processing unit(s) 302 of computing device 300 to decrypt communications between the computing device 300 and electronic devices. For instance, in some examples, the computing device 300 communicates with the electronic devices using secure encrypted communication channels. As such, the computing device 300 can utilize the encryption module 322 to encrypt communications before sending the communications to the electronic devices via the secure encrypted communication channels. Additionally, the computing device 300 can utilize the decryption module 324 to decrypt communications that are received from the electronic devices via the secure encrypted communication channels.

It should be noted that, in some examples, the secure isolated technology verification utilities 316 may not include one or more of the encryption module 322 or the decryption tool 324. For instance, in some examples, the computing device 300 can store an encryption module and/or decryption module in the computer-readable media 304 of the computing device 300. In such examples, the computing device 300 can encrypt and/or decrypt communications using the encryption module and decryption module in the computer-readable media 304.

FIGS. 4-10 illustrate example processes for using hardware based secure isolated technology to prevent piracy and cheating on electronic devices. The example processes are illustrated as a collection of blocks in a logical flow graph, which represent a sequence of operations that can be implemented in hardware, software, or a combination thereof. The blocks are referenced by numbers. In the context of software, the blocks represent computer-executable instructions stored on one or more computer memories that, when executed by one or more processing units (such as hardware microprocessors), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

Figure 4:
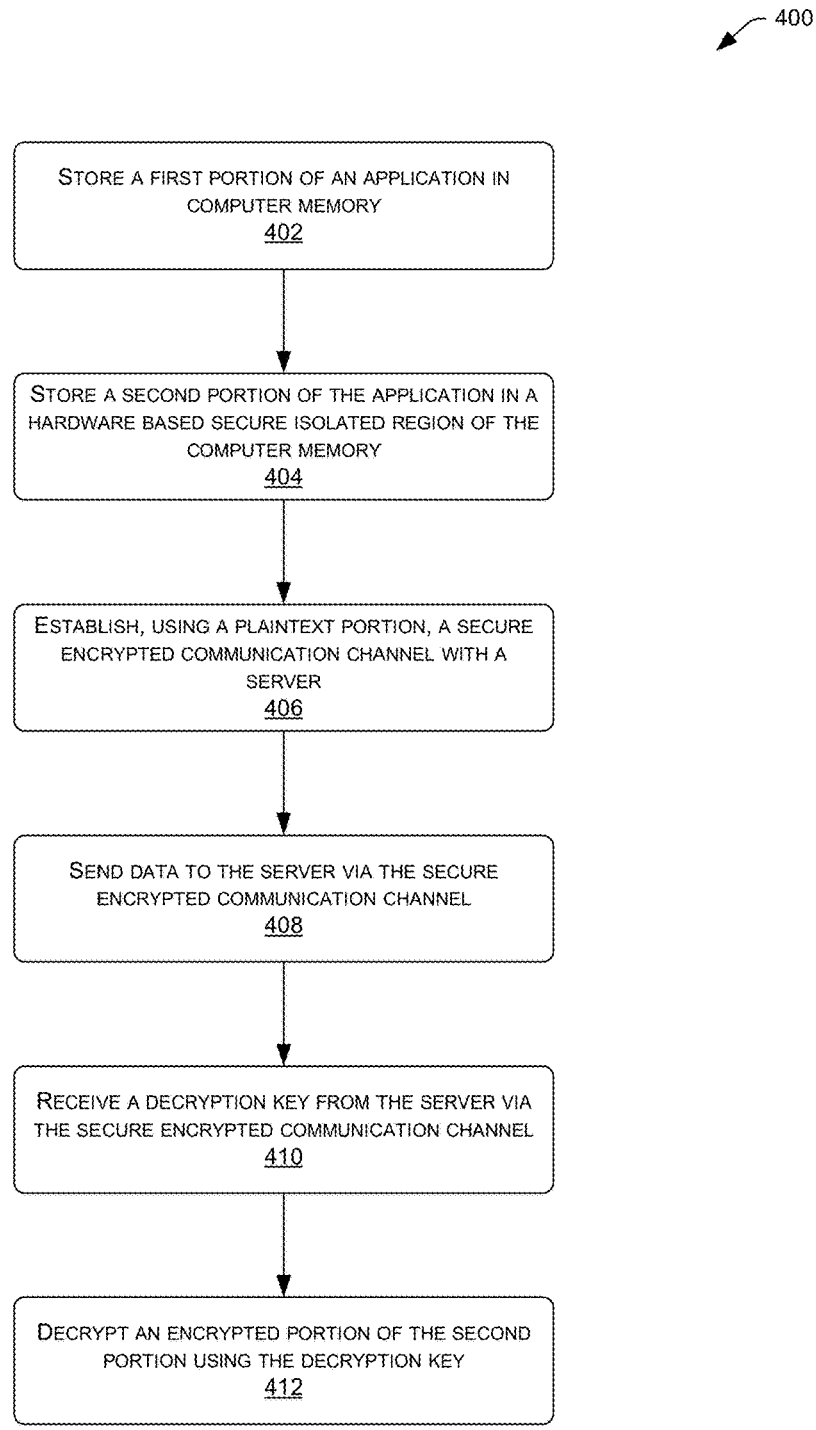
FIG. 4 is a flow diagram of an example method of an electronic device utilizing hardware based secure isolated technology to prevent piracy of an application.

FIG. 4 is a flow diagram 400 of an example method of an electronic device utilizing hardware based secure isolated technology to prevent piracy of an application. At block 402, an electronic device can store a first portion of an application in a computer memory. For instance, a developer of an application can specify which portions of the application an electronic device is to execute from the computer memory of the electronic device and which portions of the application the electronic device is to execute from a hardware based secure isolated region of the computer memory of the electronic device. As such, when preparing to execute the application, the electronic device can store a first portion of the application in the computer memory (e.g., the portion of the application that the electronic device executes from the computer memory). In some examples, the first portion of the application includes plaintext.

At block 404, the electronic device can store a second portion of the application in a hardware based secure isolated region of the computer memory. For instance, the electronic device can store a second portion of the application in a hardware based secure isolated region, where the second portion includes a plaintext portion and an encrypted portion. In some examples, the plaintext portion includes code that the electronic device uses to retrieve a decryption key from a server. For instance, the plaintext portion can include standard licensing code that downloads the decryption key. In some examples, the encrypted portion includes code that is critical for the application to execute properly. For instance, the encrypted portion can include code for AI heuristics, physics calculations, custom graphics processing unit command generation, or the like.

At block 406, the electronic device can establish, using the plaintext portion, a secure encrypted communication channel with a server. For instance, the electronic device (e.g., the processor) can execute computer-readable instructions included in the plaintext portion that cause the electronic device to establish a secure encrypted communication channel with the server. In some examples, the hardware based secure isolated region can indirectly use the secure encrypted communication channel to send and receive data with the server via the electronic device.

At block 408, the electronic device can send data to the server via the secure encrypted communication channel. For instance, the electronic device (e.g., the processor) can execute computer-readable instructions (e.g., code) included in the hardware based secure isolated region that causes the electronic device to send attestation information to the server via the secure encrypted communication channel. In some examples, the attestation information can include an identifier of the processor of the electronic device (e.g., a CPU chip number), proof that the code on the electronic device is indeed running on a device that supports hardware based secure isolation technology, and/or a digest value of the hardware based secure isolated region. In some examples, the server can perform attestation using the attestation information to verify one or more of the electronic device, the processor, and/or the hardware based secure isolated region. Additionally, in some examples, the server can determine one or more rights that the electronic device and/or a user of the electronic device has with regard to the application. For instance, the server can determine whether the electronic device and/or the user of the electronic device includes a permanent license or a floating license.

At block 410, the electronic device can receive a decryption key from the server via the secure encrypted communication channel and at block 412, the electronic device can decrypt an encrypted portion of the second portion using the decryption key. For instance, based on the verification and the determining of the rights by the server, the electronic device can receive a decryption key from the server via the secure encrypted communication channel. The electronic device can then decrypt the encrypted portion within the hardware based secure isolated region using the decryption key. For instance, the electronic device (e.g., the processor) can execute computer-readable instructions included in the plaintext portion that cause the electronic device to decrypt the encrypted portion using the decryption key.

It should be noted that, in some examples, the electronic device can then execute the application. For instance, the electronic device (e.g., the processor) can execute the first portion of the application from the computer memory, and execute the both the plaintext portion and the decrypted portion within the hardware based secure isolated region of the computer memory. In some examples, the first portion of the application can make calls to the second portion of the application within the hardware based secure isolated region during execution.

It should further be noted that, in some examples, the second portion of the application can prevent cheating during execution of the application. For instance, the second portion of the application (e.g., the encrypted portion) can include code that periodically determines whether the code of the first portion of the application is executing correctly. Determining whether the code of the first portion is executing correctly can include determining whether the code has been modified by a user of the electronic device. Additionally or alternatively, in some examples, the second portion of the application (e.g., the encrypted portion) can include code that malicious users of the application normally modify when cheating. By placing the code in the hardware based secure isolated region, the malicious users are restricted from modifying the code in order to cheat.

Figure 5:
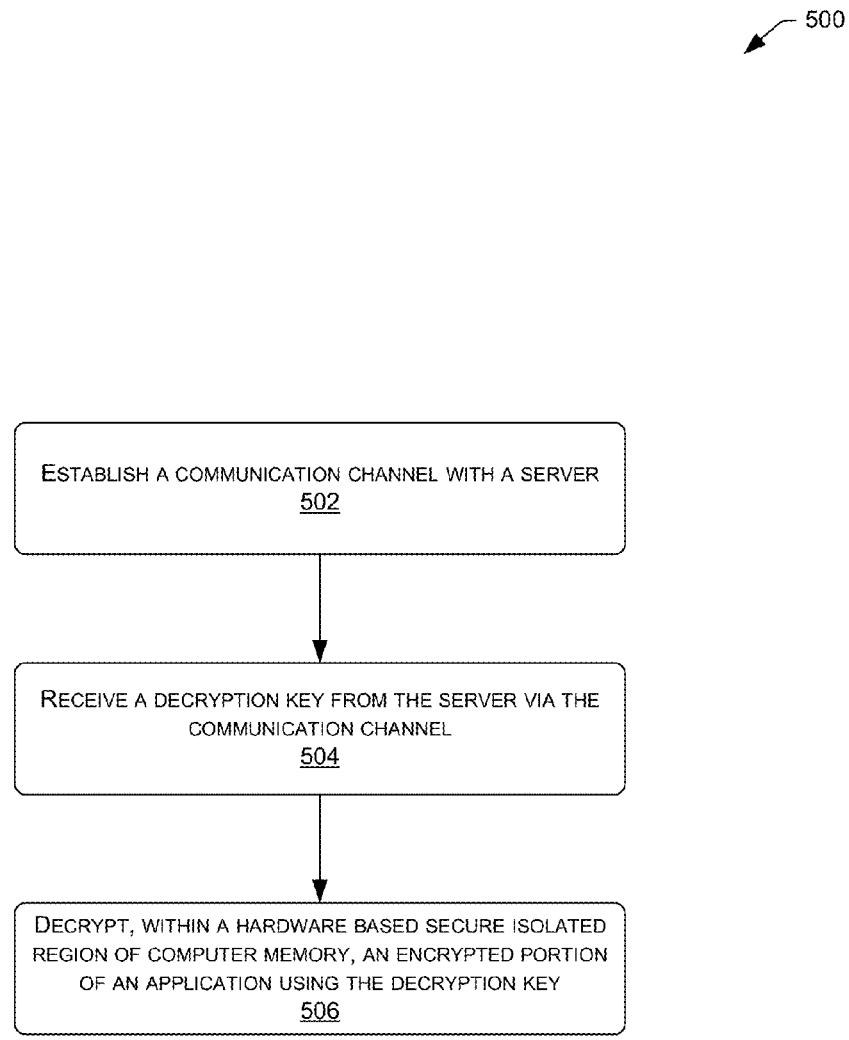
FIG. 5 is a flow diagram of an example method of an electronic device executing a portion of an application within a hardware based secure isolated region of computer memory.

FIG. 5 is a flow diagram 500 of an example method of an electronic device executing a portion of an application within a hardware based secure isolated region of computer memory. At block 502, an electronic device can establish a communication channel with a server.

At block 504, the electronic device can receive a decryption key from the server via the communication channel. For instance, the electronic device can use a portion of an application to establish a communication channel with the server. The portion of the application can include a plaintext portion stored in a hardware based secure isolated region of computer memory. In some examples, the plaintext portion includes standard license code that the electronic device uses to download the decryption key from the server.

At block 506, the electronic device can decrypt, within a hardware based secure isolated region of computer memory, an encrypted portion of an application using the decryption key. For instance, the electronic device can store the encrypted portion of the application in the hardware based secure isolated region. The electronic device can then use the decryption key to decrypt the encrypted portion within the hardware based secure isolated region. In some example, an operating system, a hypervisor, and/or firmware of the electronic device are restricted from accessing the decrypted portion of the application within the hardware based secure isolated region of the computer memory.

It should be noted that, in some examples, the electronic device can then execute the application. For instance, after decrypting the encrypted portion, the electronic device can execute the portion of the application within the hardware based secure isolated region. Additionally, the electronic device can execute any portions of the application that are stored outside of the hardware based secure isolated region.

Figure 6:
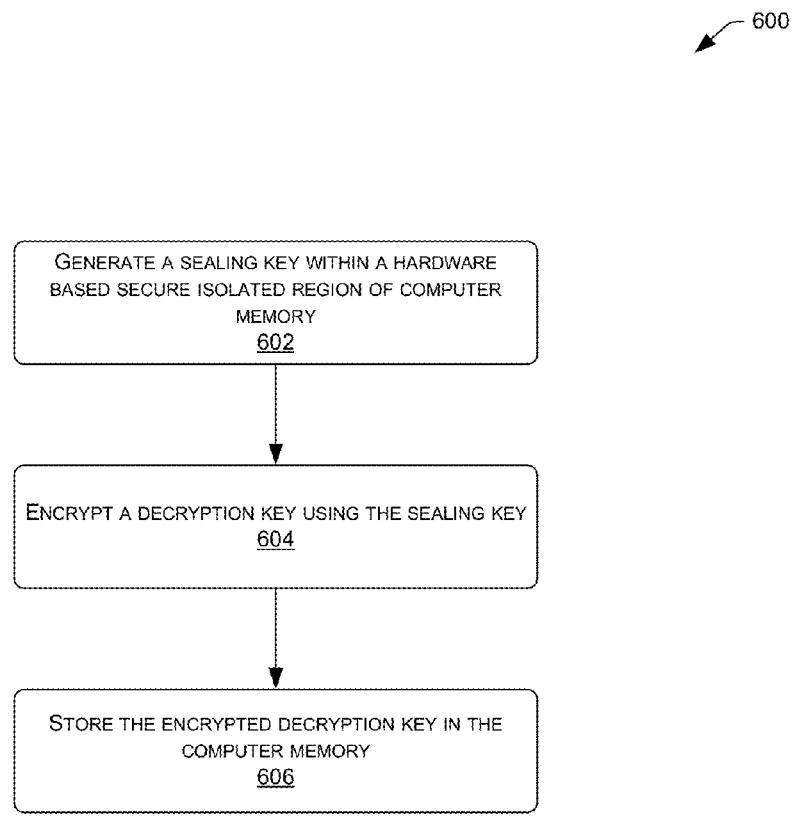
FIG. 6 is a flow diagram of an example method of utilizing hardware based secure isolated technology to secure a decryption key.

FIG. 6 is a flow diagram 600 of an example method of utilizing hardware based secure isolated technology to secure a decryption key. An electronic device can perform the method of FIG. 6 when the electronic device receives a permanent license from a server. By securely storing the decryption key, the electronic device can execute the application in an offline mode.

At block 602, hardware based secure isolated technology can cause an electronic device to generate a sealing key within a hardware based secure isolated region of computer memory. For instance, a processor of the electronic device can execute computer-readable instructions (e.g., code) included in the hardware based secure isolated region that cause the processor to generate the sealing key within the hardware based secure isolated region. In some examples, the electronic device generates the sealing key based on the processor of the electronic device and/or the hardware based secure isolated region. In such examples, only an electronic device that includes the processor and the hardware based secure isolated region can generate the same sealing key.

At block 604, the hardware based secure isolated technology of the electronic device can encrypt a decryption key using the sealing key and at block 606, the hardware based secure isolated technology can cause the electronic device to store the encrypted decryption key in the computer memory. For instance, the electronic device may execute computer-readable instructions included within a plaintext portion of an application that is stored within the hardware based secure isolated region, where the computer-readable instructions cause the electronic device to encrypt the decryption key within the hardware based secure isolated region. The electronic device can then store the encrypted decryption key in the computer memory. In some examples, the electronic device stores the encrypted decryption key in non-volatile memory.

It should be noted that, in order to execute the application in the offline mode, the hardware based secure isolated technology can retrieve the stored encrypted decryption key from the computer memory. The electronic device can then decrypt the encrypted decryption key within the hardware based secure isolated region using the sealing key, and use the decryption key to decrypt the encrypted portion of the application.

Figure 7:
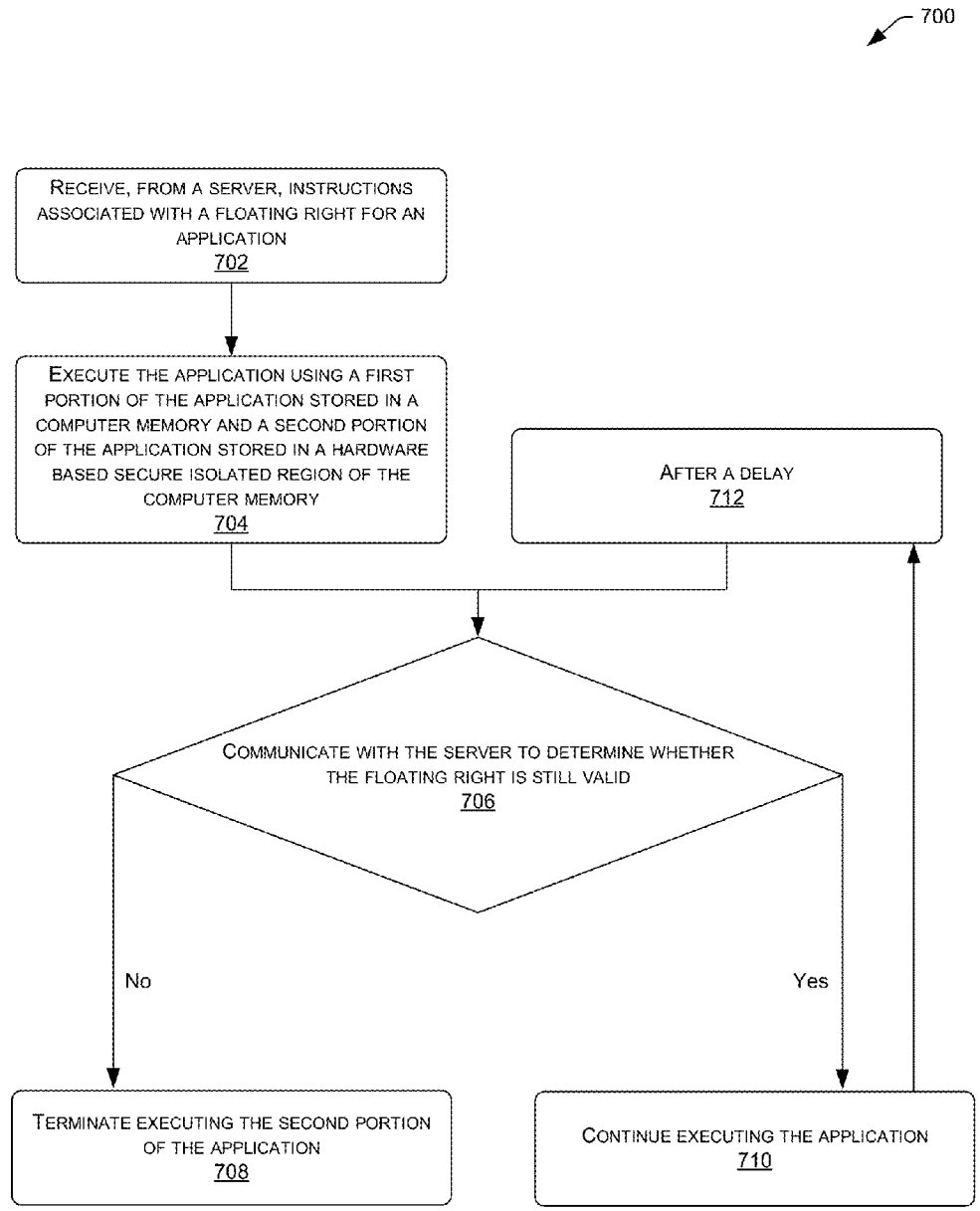
FIG. 7 is a flow diagram of an example method of an electronic device utilizing a floating right associated with an application.

FIG. 7 is a flow diagram 700 of an example method of an electronic device utilizing a floating right associated with an application. In some examples, the floating right can include a floating license that follows the user of the electronic device. For instance, each time the user provides credential (e.g., user name and password) to the server using an electronic device, the server can send that electronic device a floating license to run an application.

At block 702, an electronic device can receive, from a server, instructions associated with a floating right for an application. For instance, the electronic device can receive the instruction along with a decryption key for the application from the server. In some examples, the floating right includes a floating license for the application. In such examples, the instructions can cause a hardware based secure isolated region of the electronic device to continually and/or periodically communicate with the server to determine whether the floating license is still valid.

At block 704, the electronic device can execute the application using a first portion of the application stored in a computer memory and a second portion of the application stored in a hardware based secure isolated region of the computer memory. In some examples, the first portion of the application includes plaintext and the second portion of the application includes a plaintext portion and an encrypted portion. In such examples, the plaintext portion decrypts the encrypted portion using a decryption key so that the electronic device can execute the application.

At block 706, the hardware based secure isolated region can communicate with the server to determine whether the floating right is still valid. For instance, in some examples, the floating right can specify that a user of the electronic device can only execute the application on a single electronic device at a time. In such examples, the hardware based secure isolated region can periodically (e.g., every minute, hour, or the like) communicate with the server to determine whether the user is using another electronic device to execute the application. If the server determines that the user is using another electronic device to execute the application, then the server can determine that the floating right for the electronic device is no longer valid. However, if the user is not using another electronic device to execute the application, then the server can determine that the floating right for the electronic device is still valid.

At block 708, the hardware based secure isolated region can cause the electronic device to terminate the execution of the second portion based on the floating right not being valid or at block 710, the hardware based secure isolated region can allow the electronic device to continue to execute the second portion of the application based on the floating right still being valid.

Additionally, when the floating license is still valid, at block 712, the hardware based secure isolated region can continue to communicate with the server to determine whether the floating right is still valid after a delay. In some examples, the delay can include periodic delay, such as every minute, hour, or the like. When communicating with the server, the hardware based secure isolated region can terminate executing the application (block 708) based on the floating right no longer being valid, or continue executing the application (block 710) based on the floating right being valid.

Figure 8:
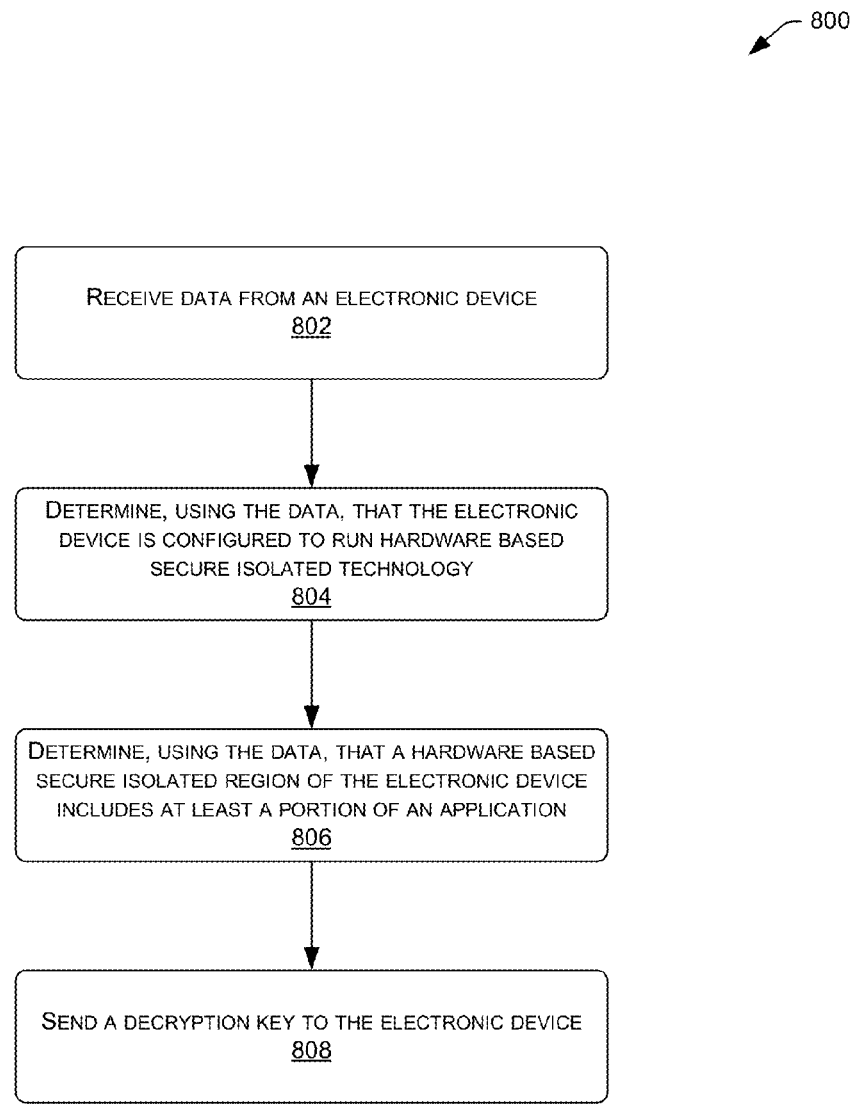
FIG. 8 is a flow diagram of a first example method of a server verifying hardware based secure isolated technology on an electronic device.

FIG. 8 is a flow diagram 800 of a first example method of a server verifying hardware based secure isolated technology on an electronic device as described herein. At block 802, the server can receive data from an electronic device. For instance, in some examples, the server can receive attestation information from the electronic device, such as an identifier for a central processing unit (CPU) chip of the electronic device, proof that the code on the electronic device is indeed running on a device that supports hardware based secure isolation technology, and/or a digest of the hardware based secure isolated region.

At block 804, the server can determine, using the data, that the electronic device determines that the electronic device is configured to run hardware based secure isolated technology. For instance, the server can determine that the electronic device includes a trusted CPU with secure isolated technology using the identifier for the CPU. In some examples, the server can use a database that stores information associates CPU chips with hardware based secure isolated technology in order to determine that the electronic device includes the hardware based secure isolated technology.

At block 806, the server can determine, using the data, that a hardware based secure isolated region of the electronic device includes at least a portion of an application. For instance, the server can determine that the digest of the hardware based secure isolated region matches a licensed application. In some examples, the server can use the digest of the hardware based secure isolated technology (from the data) to determine that the application (and/or a portion of the application) is in fact running in the hardware based secure isolated technology (e.g., a hardware based secure isolated region).

At block 808, the server sends a decryption key associated with the application to the electronic device. In some examples, the server can further send the electronic device instructions corresponding to the application when the license includes a floating license.

Figure 9:
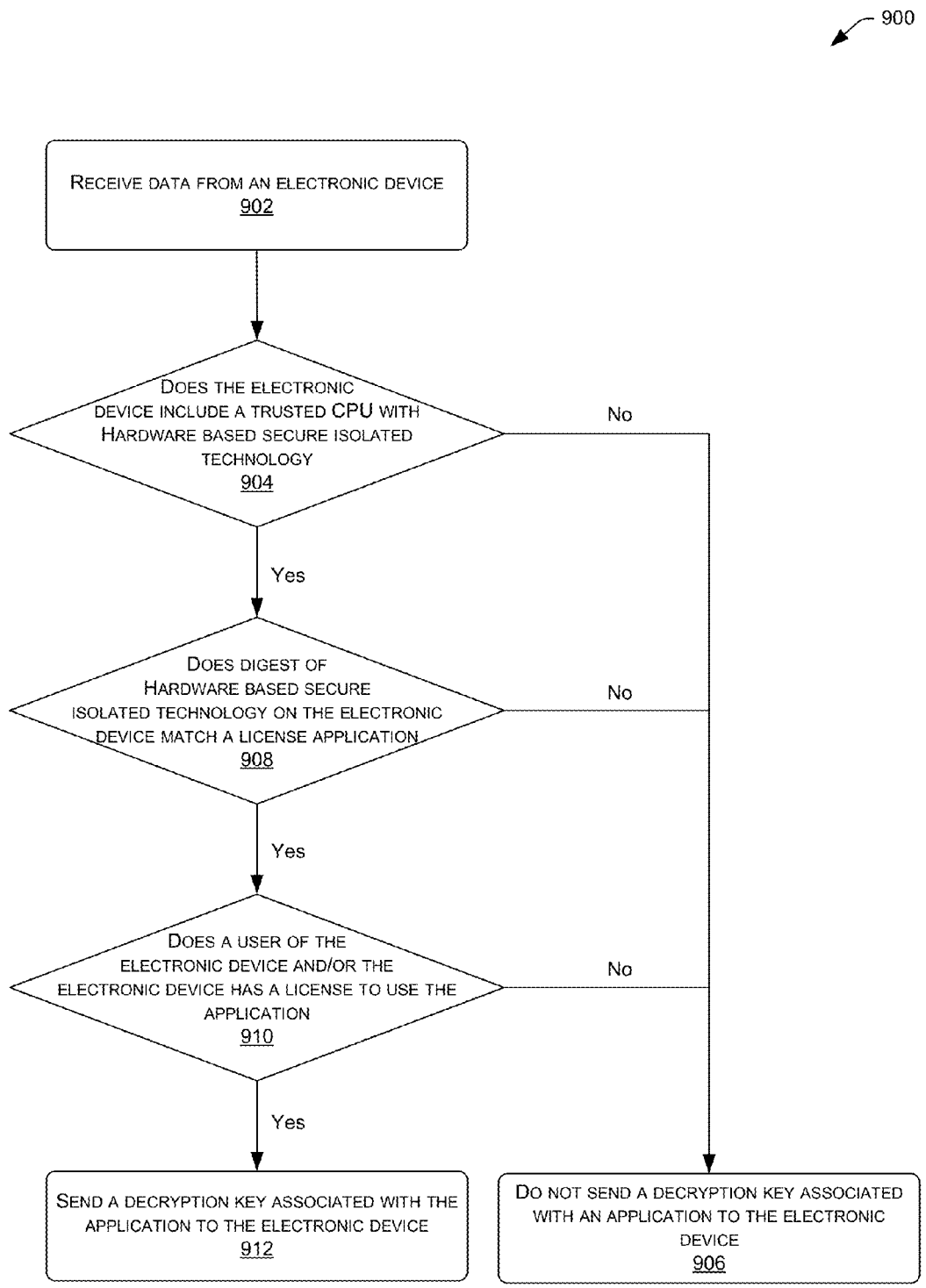
FIG. 9 is a flow diagram of a second example method of a server verifying hardware based secure isolated technology on an electronic device.

FIG. 9 is a flow diagram 900 of an example method of a server verifying hardware based secure isolated technology on an electronic device. At block 902, the server can receive data from an electronic device. For instance, in some examples, the server can receive attestation information from the electronic device, such as an identifier for a central processing unit (CPU) chip of the electronic device, proof that the code on the electronic device is indeed running on a device that supports hardware based secure isolation technology, and/or a digest of the hardware based secure isolated region.

At block 904, the server determines whether the electronic device includes a trusted CPU with hardware based secure isolated technology. In some examples, the server determines whether the electronic device includes a trusted CPU with hardware based secure isolated technology using a database. The database can store information associates CPU chips with hardware based secure isolated technology on electronic devices. If at block 904 the server determines no, then the method advances to block 906 where the server does not send a decryption key associated with an application to the electronic device. However, if at block 904 the sever determines yes, then the method advances to block 908.

At block 908, the server determines whether a digest of hardware based secure isolated technology on the electronic device matches a licensed application. For instance, the sever can use the digest of the hardware based secure isolated technology (from the data) to determine whether the application (and/or a portion of the application) is in fact running in hardware based secure isolated technology (e.g., a hardware based secure isolated region). If at block 908 the server determines no, then the method advances to block 906 where the server does not send a decryption key associated with an application to the electronic device. However, if at block 908 the sever determines yes, then the method advances to block 910.

At block 910, the server determines that a user of the electronic device and/or the electronic device has a license to use the application. For instance, in some examples, the server determines whether a user of the electronic device and/or the electronic device includes a license for the application. In some examples, the server can determine that the user of the electronic device and/or the electronic device includes a permanent license while in other examples, the server can determine that the user of the electronic device and/or the electronic device includes a floating license. If at block 910 the server determines no, then the method advances to block 906 where the server does not send a decryption key associated with an application to the electronic device. However, if at block 910 the sever determines yes, then the method advances to block 912.

At block 912, the server sends a decryption key associated with the application to the electronic device. In some examples, the server can further send the electronic device instructions corresponding to the application when the license includes a floating license.

Figure 10:
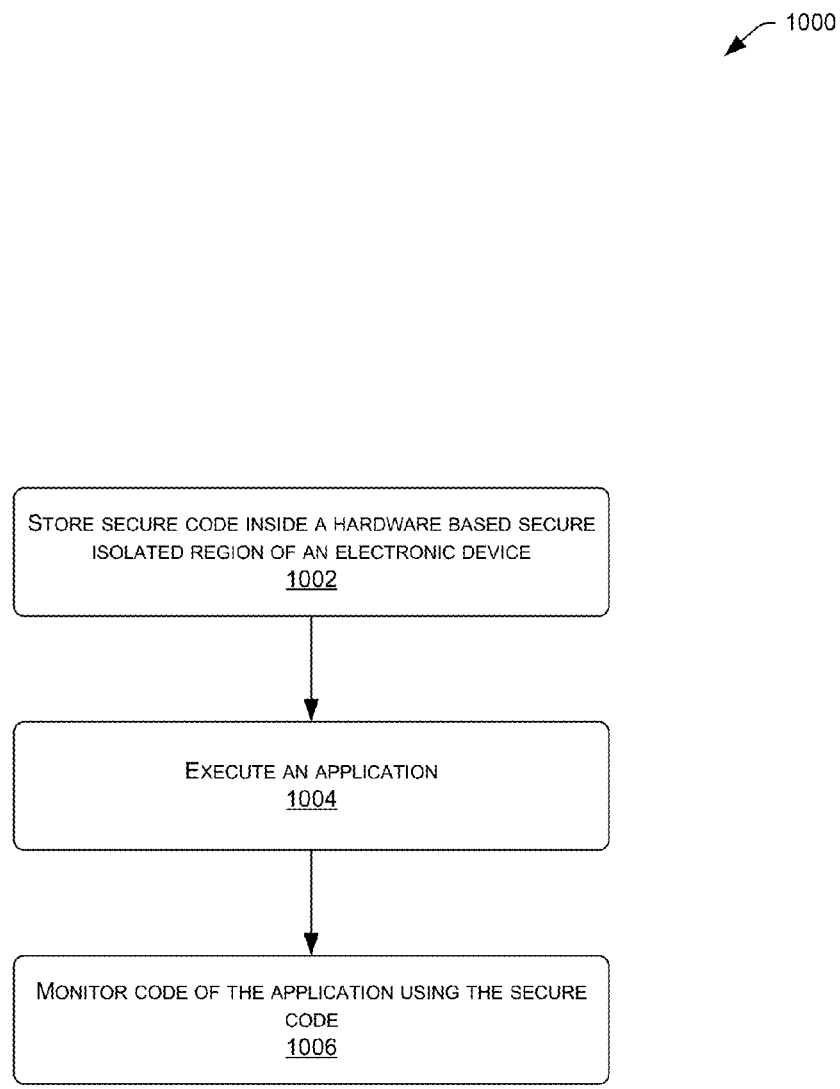
FIG. 10 is a flow diagram of a first example method of utilizing hardware based secure isolated technology to prevent cheating.

FIG. 10 is a flow diagram 1000 of a first example method for utilizing hardware based secure isolated technology to prevent cheating. At block 1002, an electronic device can store secure code inside of a hardware based secure isolated region of the electronic device. For instance, the electronic device can store secure code that the electronic device uses to monitor code of an application that is executing on the electronic device. In some examples, the secure code can include a portion of the application that the electronic device is monitoring.

At block 1004, the electronic device can execute the application and at block 1006, the electronic device can monitor code of the application using the secure code. For instance, the electronic device can use the secure code to (1) determine if the application is not executing properly, (2) check code variables to determine if the variables are correct, and/or (3) check different parts of the code of the application. In some examples, the electronic device can monitor the application during executing periodically. For instance, the electronic device can determine whether the application is executing properly every second, minute, or the like.

Figure 11:
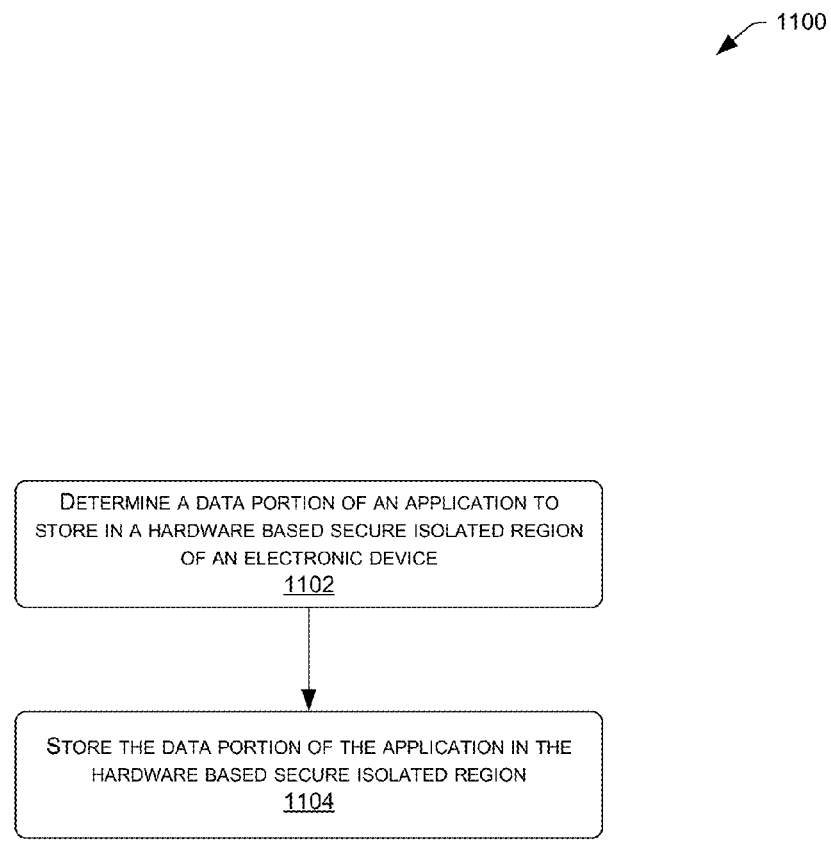
FIG. 11 is a flow diagram of a second example method of utilizing hardware based secure isolated technology to prevent cheating.

FIG. 11 is a flow diagram of a second example method for utilizing hardware based secure isolated technology to prevent cheating. At block 1102, an electronic device and/or a developer can determine a data portion of an application to store in a hardware based secure isolated region of the electronic device and at block 1104, the electronic device can store the data portion of the application in the hardware based secure isolated region. For instance, the data portion of the application can include data that malicious users are likely to manipulate in order to cheat. In some examples, the data portion of the application can include variable data of the application. For instance, if the application includes a game where a state of the game includes a health level of a user, the electronic device can store the variable data associated with the health level in the hardware based secure isolated region.

EXAMPLE CLAUSES

A: A method comprising: storing a first portion of an application in a computer memory of an electronic device; storing a second portion of the application in a secure isolated region of the computer memory of the electronic device, the second portion of the application including an encrypted portion and a plaintext portion; establishing, using the plaintext portion, a secure encrypted communication channel with a server; sending, using the secure encrypted communication channel, data to the server; based at least in part on sending the data, receiving, using the secure encrypted communication channel, a decryption key from the server; and decrypting the encrypted portion using the decryption key.

B: A method as paragraph A recites, wherein the data includes attestation information that allows the server to verify that the electronic device includes a trusted central processing unit (CPU) chip and the secure isolated region.

C: A method as paragraph B recites, wherein the attestation information includes at least one of an identifier for the CPU chip, proof that the code on the electronic device is indeed running on a device that supports hardware based secure isolation technology, or a digest of the secure isolated region.

D: A method as any of paragraphs A-C recites, further comprising executing the application using the first portion of the application, the plaintext portion of the second portion, and the decrypted portion of the second portion.

E: A method as any of paragraphs A-D recites, further comprising: generating, using the secure isolated region, a sealing key; and encrypting the decryption key using the sealing key.

F: A method as paragraph E recites, further comprising storing the encrypted decryption key in non-volatile memory.

G: A method as any of paragraphs A-F recites, wherein the plaintext portion includes licensing code for retrieving the decryption key from the server.

H: A method as any of paragraphs A-G recites, wherein the encrypted portion includes code that is critical to the usage of the application.

I: A method as any of paragraphs A-H recites, further comprising receiving instructions from the server, the instructions causing the secure isolated region to periodically communicate with the server in order to determine whether the secure isolated region should terminate.

J: A memory having computer-executable instructions stored thereon, the computer-executable instructions to configure an electronic device to perform a method as any of paragraphs A-J recites.

K: A device comprising: at least one processing unit; and a computer memory having computer-executable instructions stored thereon that, when executed by the at least one processing unit, configure the device perform a method as any of paragraphs A-J recites.

L: An electronic device comprising: at least one processor; a memory storing: a first portion of an application; and a second portion of the application in a secure isolated region of the memory, the second portion including an encrypted portion for securing the application from extraction and a plaintext portion for opening a communication channel with a server, the plaintext portion including computer-readable instructions that, when executed by the at least one processor, cause the at least one processor to: establish the communication channel with the server; receive a decryption key associated with the application from the server via the communication channel; and decrypt the encrypted portion using the decryption key.

M: A device as paragraph L recites, wherein the secure isolated region includes computer-readable instructions that, when executed by the at least one processor, cause the at least one processor to send data to the server via the communication channel, the data including attestation information that allows the server to verify that the electronic device includes secure isolated technology.

N: A device as paragraph M recites, wherein the attestation information includes at least one of an identifier for the processor, proof that code on the electronic device is indeed running on a device that supports hardware based secure isolation technology, and a digest of the secure isolated region.

O: A device as any of paragraphs L-N recites, the computer-readable instructions, when executed by the at least one processor, further cause the at least one processor to encrypt the decryption key using a sealing key generated by the secure isolated region.

P: A device as paragraph O recites, the computer-readable instructions, when executed by the at least one processor, further cause the at least one process to store the encrypted decryption key in non-volatile memory.

Q: A device as any of paragraphs L-P recites, the computer-readable instructions, when executed by the at least one processor, further cause the at least one processor to: receive instructions from the server via the communication channel, the instructions including a time interval for communicating with the server; and based at least in part on the time interval, communicate with the server to determine that a license for the application is still valid.

R: A system comprising: one or more processors; and a memory storing computer-executable instructions that, when executed by the one or more processors, cause the one or more processors to: receiving data from an electronic device, the data including at least an identifier of a central processing unit (CPU) chip of the electronic device, proof that code on the electronic device is indeed running on a device that supports hardware based secure isolation technology, and a digest of a secure isolated region; determining, using the proof that the code on the electronic device is indeed running on a device that supports hardware based secure isolation technology, that the electronic device is configured to run secure isolated technology; determine, using the digest of the secure isolated region, that the secure isolated region of the electronic device includes at least a portion of an application; and send a decryption key to the electronic device.

S: A system as paragraph R recites, the computer-readable instructions, when executed by the one or more processors, further cause the one or more processor to determine that the electronic device has a license to execute the application.

T: A system as paragraph S recites, the operations further comprising sending instruction to the electronic device, the instructions causing the secure isolated region to periodically check that the license is still valid on the electronic device.

U: A system as any of paragraphs R-T recites, wherein: receiving the data comprises receiving the data via a secure encrypted communication channel between the secure isolated region and a sever; and sending the decryption key comprises sending the decryption key via the secure encrypted communication channel.

V: A system as any of paragraphs R-U recites, wherein the digest of the secure isolated region includes a plaintext portion of the application and an encrypted portion of the application.

W: A method comprising: generating a sealing key within a hardware based secure isolated region of computer memory; encrypting a decryption key using the sealing key within the hardware based secure isolated region; and storing the encrypted decryption key in the computer memory.

X: A memory having computer-executable instructions stored thereon, the computer-executable instructions to configure an electronic device to perform a method paragraph W recites.

Y: A device comprising: at least one processing unit; and a memory having computer-executable instructions stored thereon that, when executed by the at least one processing unit, configure the device perform a method as paragraph W recites.

Z: A method comprising: receiving, from a server, instructions associated with a floating right for an application; executing the application using a first portion of the application stored in computer memory and a second portion of the application stored in a hardware based secure isolated region of the computer memory; communicating with the server to determine whether the floating right is still valid; and performing at least one of: terminating the execution of the second portion of the application based at least in part on the floating right not being valid, or continue executing the application based at least in part on the floating right being valid.

AA: A memory having computer-executable instructions stored thereon, the computer-executable instructions to configure an electronic device to perform a method paragraph Z recites.

AB: A device comprising: at least one processing unit; and a memory having computer-executable instructions stored thereon that, when executed by the at least one processing unit, configure the device perform a method as paragraph Z recites.

AC: A method comprising: storing secure code inside a hardware based secure isolated region of an electronic device; executing the application; and monitoring code of the application using the secure code.

AD: A memory having computer-executable instructions stored thereon, the computer-executable instructions to configure an electronic device to perform a method paragraph AC recites.

AE: A device comprising: at least one processing unit; and a memory having computer-executable instructions stored thereon that, when executed by the at least one processing unit, configure the device perform a method as paragraph AC recites.

CONCLUSION

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer memories that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) 106, 120, 200, and/or 300 such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   storing a first portion of an application in a computer memory of an electronic device, wherein the application further includes a second portion required for execution of the application;
   storing the second portion of the application in a secure isolated region of the computer memory of the electronic device, the second portion of the application including an encrypted portion and a plaintext portion, wherein the encrypted portion prevents the first portion and the second portion of the application from functioning correctly until the encrypted portion is accurately decrypted;
   establishing, using the plaintext portion, a secure encrypted communication channel with a server;
   sending, using the secure encrypted communication channel, data to the server;
   based at least in part on sending the data, receiving, using the secure encrypted communication channel, a decryption key from the server;
   decrypting the encrypted portion using the decryption key; and
   executing the first portion of the application from the computer memory of the electronic device and both of the encrypted portion and the plaintext portion of the second portion of the application from the secure isolated region of the computer memory in response to decrypting the encrypted portion.

2. The method of claim 1, wherein the data includes attestation information that allows the server to verify that the electronic device includes a trusted central processing unit (CPU) chip and the secure isolated region.

3. The method of claim 2 recites, wherein the attestation information includes at least one of an identifier for the CPU chip, proof that the code on the electronic device is indeed running on a device that supports hardware based secure isolation technology, or a digest of the secure isolated region.

4. The method of claim 1 recites, further comprising:
   generating, using the secure isolated region, a sealing key; and
   encrypting the decryption key using the sealing key.

5. The method of claim 4 recites, further comprising storing the encrypted decryption key in non-volatile memory.

6. The method of claim 1 recites, wherein the plaintext portion includes licensing code for retrieving the decryption key from the server.

7. The method of claim 1 recites, wherein the encrypted portion includes code that is critical to usage of the application.

8. The method of claim 1 recites, further comprising receiving instructions from the server, the instructions causing the secure isolated region to periodically communicate with the server in order to determine whether the secure isolated region should terminate.

9. The method of claim 1, wherein the first portion of the application calls the second portion of the application within the secure isolated region during execution of the first portion of the application from the computer memory of the electronic device and both of the encrypted portion and the plaintext portion of the second portion of the application from the secure isolated region of the computer memory.

10. An electronic device comprising:
    at least one processor;
    a memory storing:
      a first portion of an application, wherein the application further includes a second portion required for execution of the application; and
      the second portion of the application in a secure isolated region of the memory, the second portion including an encrypted portion for securing the application from extraction and a plaintext portion for opening a communication channel with a server, wherein the encrypted portion prevents the first portion and the second portion of the application from functioning correctly until the encrypted portion is accurately decrypted,
      the plaintext portion including computer-readable instructions that, when executed by the at least one processor, cause the at least one processor to:
      establish the communication channel with the server;
      receive a decryption key associated with the application from the server via the communication channel;
      decrypt the encrypted portion using the decryption key; and
      execute the first portion of the application from the computer memory of the electronic device and both of the encrypted portion and the plaintext portion of the second portion of the application from the secure isolated region of the computer memory in response to decrypting the encrypted portion.

11. The device of claim 10, wherein the secure isolated region includes computer-readable instructions that, when executed by the at least one processor, cause the at least one processor to send data to the server via the communication channel, the data including attestation information that allows the server to verify that the electronic device includes secure isolated technology.

12. The device of claim 11 recites, wherein the attestation information includes at least one of an identifier for the at least one processor, proof that code on the electronic device is indeed running on a device that supports hardware based secure isolation technology, and a digest of the secure isolated region.

13. The device of claim 10 recites, the computer-readable instructions, when executed by the at least one processor, further cause the at least one processor to encrypt the decryption key using a sealing key generated by the secure isolated region.

14. The device of claim 13 recites, the computer-readable instructions, when executed by the at least one processor, further cause the at least one process to store the encrypted decryption key in non-volatile memory.

15. The device of claim 10 recites, the computer-readable instructions, when executed by the at least one processor, further cause the at least one processor to:
    receive instructions from the server via the communication channel, the instructions including a time interval for communicating with the server; and
    based at least in part on the time interval, communicate with the server to determine that a license for the application is still valid.

* * * * *